(12) United States Patent
Warren

(10) Patent No.: US 10,196,006 B1
(45) Date of Patent: Feb. 5, 2019

(54) DEVICES AND SYSTEMS FOR ALIGNING AND MOUNTING SAFETY DEVICES IN VEHICLES

(71) Applicant: Robert Lee Warren, Lancaster, PA (US)

(72) Inventor: Robert Lee Warren, Lancaster, PA (US)

( * ) Notice: Subject to any disclaimer, the term of this patent is extended or adjusted under 35 U.S.C. 154(b) by 204 days.

(21) Appl. No.: 15/346,632

(22) Filed: Nov. 8, 2016

(51) Int. Cl.
| | |
|---|---|
| *B43L 13/20* | (2006.01) |
| *B60R 11/04* | (2006.01) |
| *B60J 1/02* | (2006.01) |
| *B60R 11/00* | (2006.01) |

(52) U.S. Cl.
CPC .............. *B60R 11/04* (2013.01); *B60J 1/02* (2013.01); *B60R 2011/0026* (2013.01)

(58) Field of Classification Search
CPC ................................. B43L 13/20; B43L 3/14
USPC ................................. 33/286, 288, 563, 666
See application file for complete search history.

(56) References Cited

U.S. PATENT DOCUMENTS

| | | | | |
|---|---|---|---|---|
| 5,472,168 A | * | 12/1995 | Tapp ..................... | B29C 33/307 249/139 |
| 6,550,153 B1 | * | 4/2003 | Keith .................... | E04F 21/003 33/194 |
| 7,293,368 B1 | * | 11/2007 | Faulk ..................... | G01C 11/00 33/194 |
| 2003/0061722 A1 | * | 4/2003 | Bradley ................. | E04G 21/18 33/563 |
| 2003/0110653 A1 | * | 6/2003 | Schafer ................. | B26B 29/06 33/562 |
| 2008/0052941 A1 | * | 3/2008 | Nyberg .................. | B25H 7/00 33/566 |
| 2012/0025566 A1 | * | 2/2012 | Wisniewski ........... | B60R 13/02 296/191 |
| 2015/0240400 A1 | * | 8/2015 | Baker .................... | D05B 97/12 33/566 |

* cited by examiner

*Primary Examiner* — G. Bradley Bennett
(74) *Attorney, Agent, or Firm* — Rhodes IP PLC; Christopher R Rhodes

(57) ABSTRACT

Certain configurations are described of systems and devices that can be used to assist in mounting a vehicle safety device in an automobile, truck, train or other vehicle. In some examples, the device comprises a template which can reversibly couple to a vehicle component such as a windshield or a bumper. In some instances, the template may comprise one or more alignment indicators or markings that facilitate mounting of the vehicle safety device in a selected position or to the windshield.

20 Claims, 10 Drawing Sheets

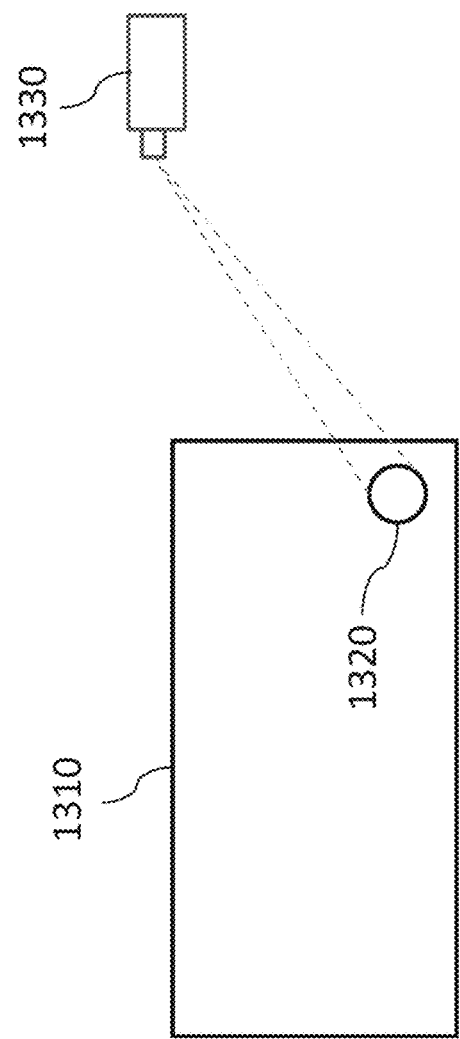

DEVICES AND SYSTEMS FOR ALIGNING AND MOUNTING SAFETY DEVICES IN VEHICLES

TECHNOLOGICAL FIELD

Certain embodiments described herein are directed to devices and systems which can be used in aligning and/or mounting vehicle safety devices. More particularly, certain embodiments are described which are directed to templates which can be used to align and/or mount one or more vehicle safety devices in a vehicle.

BACKGROUND

Vehicle safety devices are commonly present in newer vehicles such as automobiles and trucks. Many older vehicles lack safety devices, but aftermarket safety devices can be purchased and installed.

SUMMARY

In a first aspect, a vehicle safety device mounting template comprises a substrate sized and arranged to reversibly couple to a windshield of a vehicle. In some instances, the template comprises about a same length and about a same width as a length and a width of the windshield of the vehicle. In certain configurations, the template comprises at least one alignment indicator present in a first position, wherein the first position corresponds to a position where a vehicle safety device is to be mounted to the windshield and within the vehicle.

In some embodiments, the alignment indicator comprises a geometry and size that mirrors a geometry and size of a terminal region of the vehicle safety device to be mounted to the windshield. In other embodiments, the substrate comprises a polyolefin. In certain examples, the polyolefin is polyethylene or polypropylene. In some examples, the substrate comprises cardboard, plywood, acrylic, ABS plastic, melamine, vinyl or paper. In certain examples, the alignment indicator is circular. In other instances, the alignment indicator comprises a cut-out shape. In some examples, the alignment indicator comprises a raised surface. In further examples, the template is configured to tear away from the windshield. In some configurations, the substrate is opaque and the alignment indicator is optically transparent.

In another aspect, a vehicle safety device mounting template comprises a substrate sized and arranged to reversibly couple to a windshield of a vehicle, in which the template is sized and arranged to be smaller than a width and a length of the windshield of the vehicle. In some embodiments, the template comprises at least one alignment indicator present in a first position, wherein the first position corresponds to a position where a vehicle safety device is to be mounted to the windshield and within the vehicle.

In certain examples, the template is sized and arranged to contact two edges of the windshield of the vehicle. In other examples, the template is sized and arranged to contact three edges of the windshield of the vehicle. In some embodiments, the substrate comprises a polyolefin, e.g., polyethylene or polypropylene. In other examples, the substrate comprises cardboard, plywood, acrylic, ABS plastic, melamine, vinyl or paper. In certain embodiments, the alignment indicator is circular or comprises a cut-out shape. In other embodiments, the alignment indicator comprises a raised surface. In certain examples, the template is configured to tear away from the windshield. In some instances, the substrate is opaque and the alignment indicator is optically transparent.

In an additional aspect, a method of mounting a vehicle safety device to a windshield of a vehicle comprises disposing a template on the windshield of the vehicle, the template comprising a substrate configured to reversibly couple to the windshield of the vehicle, in which the template comprises at least one alignment indicator present on the template in a first position, wherein the first position corresponds to a position where a vehicle safety device is to be mounted to the windshield of the vehicle, and aligning the vehicle safety device with the alignment indicator on the template prior to mounting the vehicle safety device to the windshield of the vehicle.

In certain embodiments, the method comprises removing the template after the vehicle safety device is mounted. In other embodiments, the method comprises configuring the template as a window film which remains on the windshield after the vehicle safety device is mounted. In certain instances, the disposing step comprises disposing the template on an interior surface of the windshield. In some examples, the disposing step comprises disposing the template on an exterior surface of the windshield. In further embodiments, the method comprises configuring the template with a second alignment indicator. In some examples, the method comprises configuring the alignment indicator with a raised surface configured to receive a terminal end of the vehicle safety device. In certain instances, the method comprises configuring the substrate of the template to be opaque and configuring the alignment indicator to be optically transparent. In other examples, the method comprises configuring the alignment indicator to be opaque and configuring the substrate of the template to be optically transparent. In certain examples, the method comprises selecting the vehicle to be one of a passenger automobile, a truck, a train, a bus, a subway car, an airplane or an unmanned aerial vehicle.

In another aspect, a vehicle windshield comprises a substrate sized and arranged to couple to a windshield frame of a vehicle, the vehicle windshield comprising at least one integral alignment indicator in a first position within the vehicle windshield, wherein the first position corresponds to a position where a vehicle safety device is to be mounted to the windshield.

In certain examples, the integral alignment indicator comprises a geometry and size that mirrors a geometry and size of a terminal region of the vehicle safety device to be mounted to the windshield. In some embodiments, the integral alignment indicator is viewable using non-visible light. In other configurations, the integral alignment indicator is sized and arranged to permit alignment of at least one of a vehicle safety device configured for lane keeping monitoring, collision avoidance monitoring, speed monitoring or video recording. In some embodiments, the vehicle windshield is sized and arranged to couple to a windshield frame of a truck, or a subway car, or an airplane, or a train car, or an unmanned aerial vehicle, or a passenger automobile.

In another aspect, a vehicle windshield comprises a windshield substrate sized and arranged to couple to a windshield frame of the vehicle, and a removable template disposed on the vehicle windshield. For example, the removable template comprises at least one alignment indicator present on the template in a first position, wherein the first position corresponds to a position where a vehicle safety device is to be mounted to the vehicle windshield.

In certain embodiments, the removable template is configured as an optically transparent substrate and the alignment indicator is configured as an optically opaque marking. In some examples, the removable template is configured to couple to the windshield using static cling. In certain instances, the removable template is configured to couple to the windshield using a residue free adhesive. In some embodiments, the vehicle windshield is sized and arranged to couple to a windshield frame of a truck, or a subway car, or an airplane, or a train car, or an unmanned aerial vehicle, or a passenger automobile.

In an additional aspect, a kit comprises a vehicle windshield, a template comprising a substrate sized and arranged to reversibly couple to the vehicle windshield, the template comprising at least one alignment indicator present in a first position, wherein the first position corresponds to a position where a vehicle safety device is to be mounted to the vehicle windshield, and instructions for using the template to align and mount the vehicle safety device to the vehicle windshield. In some examples, the template is sized and arranged to be smaller than a width and a length of the vehicle windshield. In other examples, the template comprises about a same length and about a same width as a length and a width of the vehicle windshield. In certain instances, the substrate comprises one or more of a polyolefin, cardboard, plywood, acrylic, ABS plastic, melamine, vinyl or paper. In other embodiments, the template is pre-disposed on the windshield.

In another aspect, a kit comprises a vehicle windshield comprising an integral alignment indicator present in a first position, wherein the first position corresponds to a position where a vehicle safety device is to be mounted to the vehicle windshield, and instructions for using the integral alignment indicator to align and mount the vehicle safety device to the vehicle windshield.

In some examples, the integral alignment indicator is viewable using non-visible light. In other examples, the integral alignment indicator is sized and arranged to permit alignment of at least one of a vehicle safety device configured for lane keeping monitoring, collision avoidance monitoring, speed monitoring or video recording. In some embodiments, the vehicle windshield is sized and arranged to couple to a windshield frame of a truck, a passenger automobile, a subway car, an airplane, a train car, or an unmanned aerial vehicle. In other embodiments, the kit also comprises a template comprising a substrate sized and arranged to reversibly couple to the vehicle windshield, the template comprising at least one additional alignment indicator.

In another aspect, a method of mounting a vehicle safety device to a windshield of a vehicle comprises projecting a virtual alignment indicator onto a first position of the windshield of the vehicle, wherein the first position corresponds to a position where a vehicle safety device is to be mounted to the windshield of the vehicle, and aligning the vehicle safety device with the projected alignment indicator prior to mounting the vehicle safety device to the windshield of the vehicle.

In some examples, the method comprises removing the virtual alignment indicator after the vehicle safety device is mounted. In other examples, the projecting step comprises projecting the alignment indicator on an interior surface of the windshield. In some embodiments, the projecting step comprises projecting the alignment indicator on an exterior surface of the windshield. In certain examples, the method comprises projecting a second alignment indicator on the windshield. In other embodiments, the method comprises selecting the vehicle to be one of a passenger automobile, a truck, a train, a bus, a subway car, an airplane or an unmanned aerial vehicle.

Additional aspect, examples, embodiments and features are described in more detail below.

BRIEF DESCRIPTION OF THE FIGURES

Certain illustrative configurations are described below with reference to the accompanying figures in which:

FIG. 13 shows a projected virtual alignment indicator on a windshield, in accordance with certain examples.

It will be recognized by the person of ordinary skill in the art, given the benefit of this disclosure, that the dimensions of the templates, windshields, etc. are not necessarily to scale and other dimensions, shapes, geometries and configurations than those described herein may also be used.

DETAILED DESCRIPTION

Certain configurations of a template which can be used to mount and/or align one or more vehicle safety devices inside or outside of a vehicle are described below. In some examples, the template may be conformable or flexible such that it takes the shape of the surface of the vehicle which the template is reversibly coupled. If desired, however, the template may be rigid and/or non-bendable and still permit mounting/alignment of the vehicle safety device. The template can be reused more than once or it can be designed for a single use and discarded post-use. While not required, the vehicle safety device is typically mounted in contact with a windshield (or other opening) by aligning some portion of the vehicle safety device with the alignment indicator(s).

In certain examples, the exact vehicle safety device added or included in the vehicle may vary. For example, the vehicle safety device may comprise a camera, optical sensors and/or other features to permit the vehicle device to perform lane keeping measurements, collision avoidance sensing measurements, may be used for speed sensing measurements, may be used to detect objects such as pedestrians, other vehicles or other stationary or moving objects, may be used to record video, audio, etc., can be used to provide dynamic radar based cruise control to maintain a set distance between vehicles or can be used for other purposes. The vehicle safety device may be mounted in the interior portion of a vehicle cabin or can be mounted outside of the vehicle cabin, e.g., in or behind a bumper, bumper cover, fender well, mirror, mirror cover, etc. The vehicle safety device can be mounted looking forward, e.g., facing toward the front of the vehicle, looking backward, e.g., facing toward the rear of the vehicle and/or looking to the side, down toward a road, train-track, runway, etc., or looking upward toward the sky. As noted in more detail below, the template can be used with windshields, bumpers, etc. on vehicles such as passenger automobiles, buses, subway vehicles, trains, planes, ships, aerospace vehicles such as satellites, unmanned aerial vehicles and the like.

Figure 1:
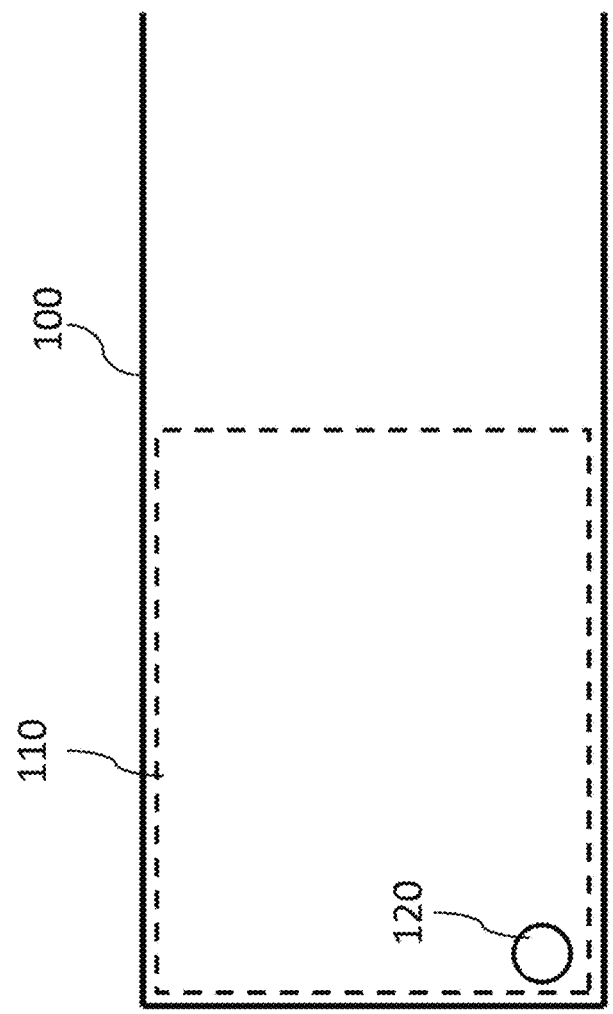
FIG. 1 is an illustration of a template applied to a windshield section, in accordance with certain embodiments.

In certain embodiments, the devices described herein may be configured as a template which reversibly couples to a windshield of a vehicle. For example and referring to FIG. 1, a front view of a section of a windshield 100 is shown as being a generally flat planar structure, but it may be curved or take shapes other than a flat planar structure. A template 110 is shown as being reversibly coupled to the windshield 100. The template 110 may comprise markings, indicia, cut-outs, etc. generally in the shape of a safety device to be mounted inside the cabin of the vehicle adjacent to the windshield 100. For example, the template 110 comprises a round alignment indicator 120 positioned at a suitable site on the template 110 such that placement of the safety device (not shown) within the alignment indicator 120 (when the template 110 is viewed from the front of the vehicle) will result in proper mounting and alignment of the safety device without the need to make adjustments to the safety device. While not shown, the template 110 may be sized and arranged to be placed from "edge-to-edge" of the windshield 100. For example, the template may generally comprise the same length and width as the windshield 100 such that the indicator 120 is present at a suitable position for placement of the vehicle safety device.

In use, the template 110 can be reversibly coupled to the windshield 100, e.g., by placing the template on the outside or the inside of the windshield 100, and the safety device would be mounted in the interior of the cabin of the vehicle by aligning the device with the indicator 120. The template 110 can be removed from the windshield 100 or it may be left in place and be removed by the customer or end-user prior to driving of the vehicle. For example, the template may comprise user instructions or instructions related to the vehicle safety device printed or embedded on it. The user can remove the template prior to vehicle operation or leave it in place. In some instances, the template can be removed and then reused on a different vehicle.

In certain examples, the exact configuration of the template 110 permits the template 110 to couple to the windshield 100 in many different manners. For example, where the template 110 takes the form of a generally clear film with suitable markings, the template can be applied similar to window tint, e.g., may comprise an adhesive such as a residue free adhesive. In other instances where the template is configured as a film, the template may couple to the windshield using static cling. In yet other configurations, the template may be taped, adhered or otherwise attached to the windshield using external attachment means including, but not limited to, tape, glue, mechanical supports, held in place by an installer or by other means to place the template against some surface of the windshield at least for some period. The template can be coupled to the outside of the windshield or the inside of the windshield or one template can be present on the outside of a windshield and a second template can be present on the inside of a windshield.

In certain embodiments, the template may generally be a lightweight structure weighing less than about ten pounds to permit a single person to couple the template to a windshield. The template may be rigid, flexible, bendable, or have other properties depending on the type of vehicle windshield the template is to be used with. The template can be designed for single use or may be reusable. In some instances, the template may comprise one or more of cardboard, plywood, acrylic, ABS plastic, melamine, vinyl based materials, vinyl with adhesive, static cling, and paper. In certain examples, the template may comprise an olefin polymer, e.g., polyethylene, polypropylene, etc., to provide for a lightweight template, generally be transparent and to permit easy application and removal from the windshield. The alignment indicator (s) may be integral to the template during production of the template or can be added to the template, e.g., using stickers, labels, etc., post-production of the template.

In some instances, the template 110 can be configured similar to a windshield tear off and can be removed from the windshield by pulling on one or more sides of the template 110. In some instances, the entire template 110 is removed, whereas in other instances only a portion of the template 110 is torn off. In certain examples, the template 110 may comprise a release liner or other layer to prevent the template 110 from sticking to a surface undesirably or prematurely. While the alignment indicator on the template 110 may be fixed in position in some configurations, in other configurations, the alignment indicator may be applied post-disposition of the template 110 on the windshield 100.

Figure 2:
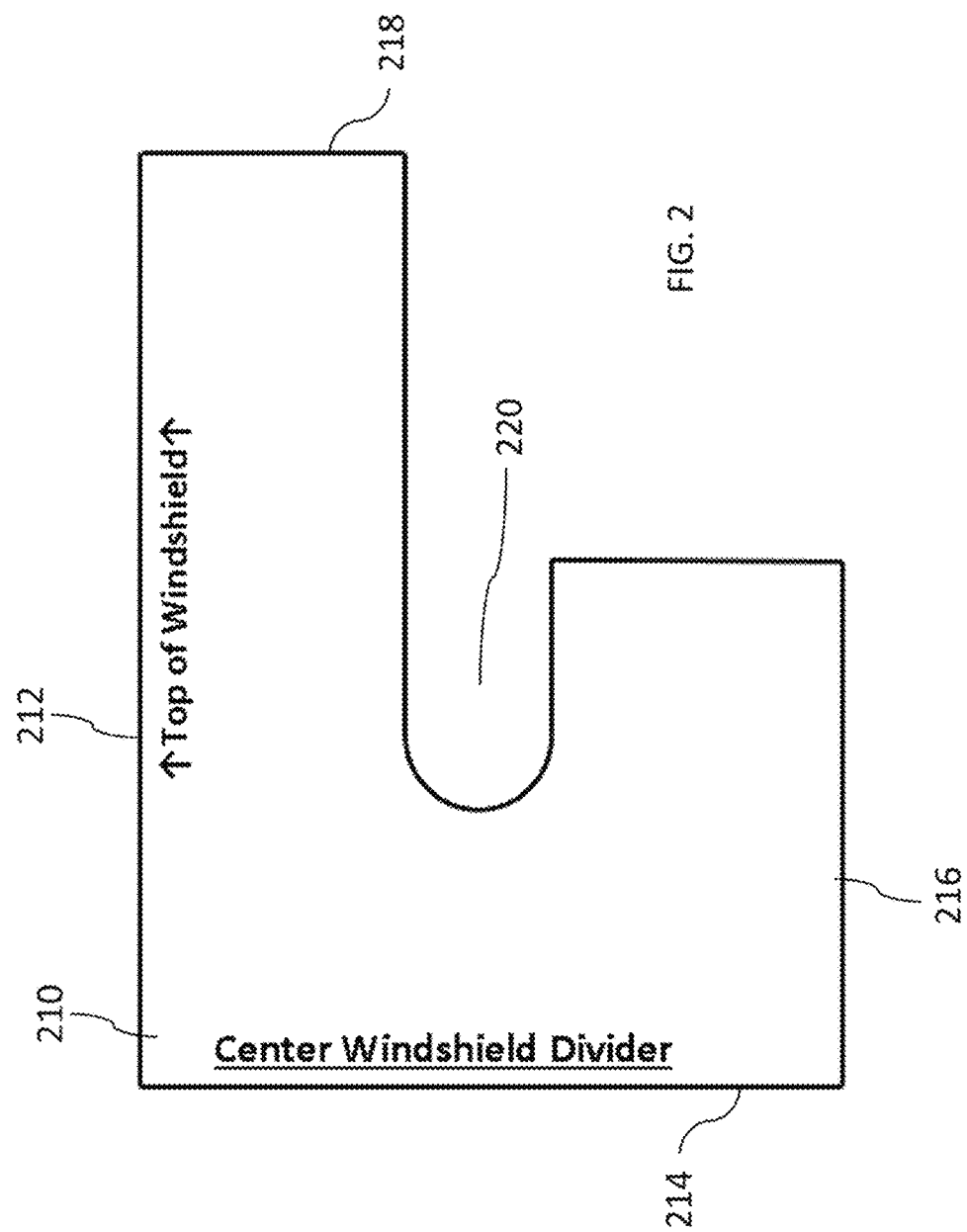
FIG. 2. an illustration of a template comprising a cut-out, in accordance with certain examples.

While the template 110 is shown as being generally rectangular, the template can be asymmetric or may take other shapes. For example and referring to FIG. 2, a template 210 is shown which can be reversibly coupled to the inside or the outside of the windshield. In some examples, the template 210 may comprise an alignment indicator 220, which in this configuration is configured as a cut-out. The template shown in FIG. 2 can be configured for use with a divided windshield such as those commonly found on large trucks. For example, a side 212 may be placed against the center windshield divider, a side 214 can be placed against a top surface of the windshield and a side 216 can be placed against the bottom surface of the windshield. The side 218 may be placed against another side of the windshield or it can be sized and arranged to not contact a side of the windshield.

Figure 3:
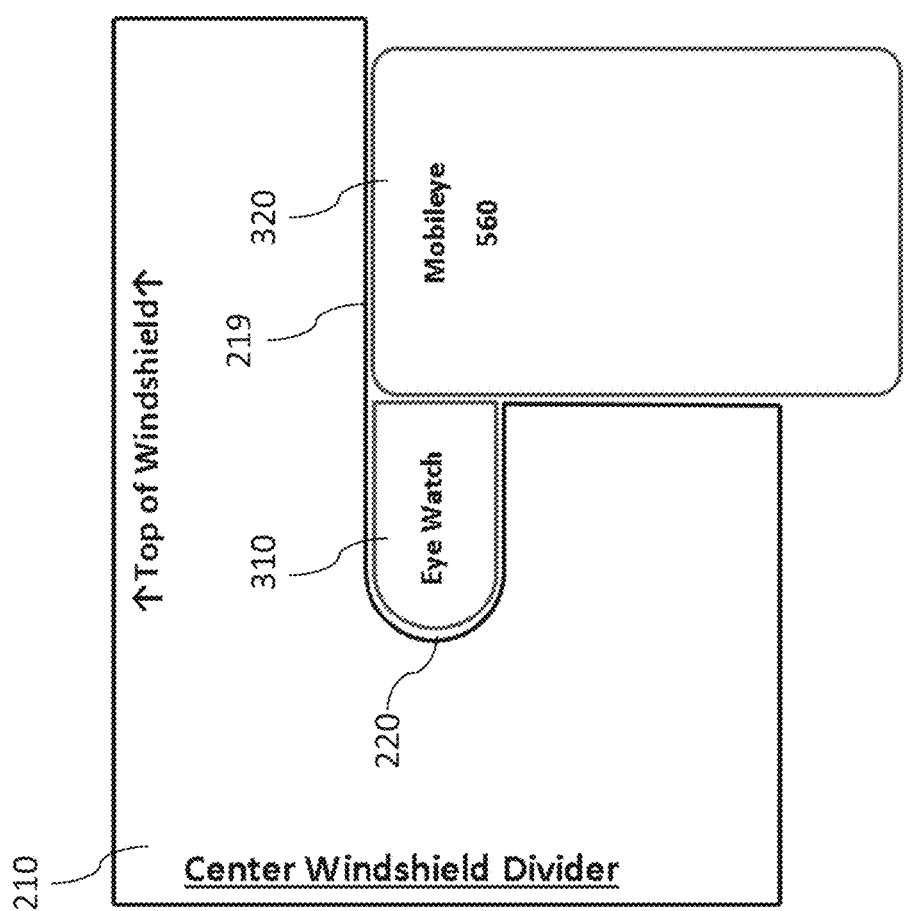
FIG. 3 is an illustration of the template of FIG. 2 showing two safety devices mounted to a windshield, in accordance with certain examples.

In use of the template 210, the template 210 can be reversibly coupled to a windshield by placing the template 210 on the windshield and permitting the template 210 to remain in place through static interactions, e.g., static cling. A first vehicle safety device 310 (see FIG. 3) is then placed against the windshield and positioned to be generally aligned with the alignment indicator 220 of the template 210. If desired, a second safety device 320 can then be placed adjacent to the first safety device 310. For example, a top surface of the safety device 320 can be placed against an edge 219 of the template 210 with the edge 219 functioning as a second alignment indicator.

In certain embodiments, the devices 310, 320 can be the same or can be different and one of the devices can be omitted entirely if desired. In some instances, one of the safety devices used with the templates described herein may be configured to provide forward collision warnings, pedestrian collision warnings, lane departure warnings, headway warnings, provide for high beam control, provide for traffic signal recognition or perform other functions. In some examples, the vehicle safety device can be integrated with the controller of the vehicle. For example, the vehicle safety device can communicate with the vehicle through a CAN bus, OBDII port or other interface of the vehicle. The vehicle safety device typically is coupled to the 12 Volt system of the vehicle though it may comprise its own power source, e.g., battery power, solar cell, etc. The vehicle safety device typically comprises its own processor, memory unit and one or more sensors, though any one or more of these components may instead be present on the vehicle and used by the vehicle safety device.

Figure 4:
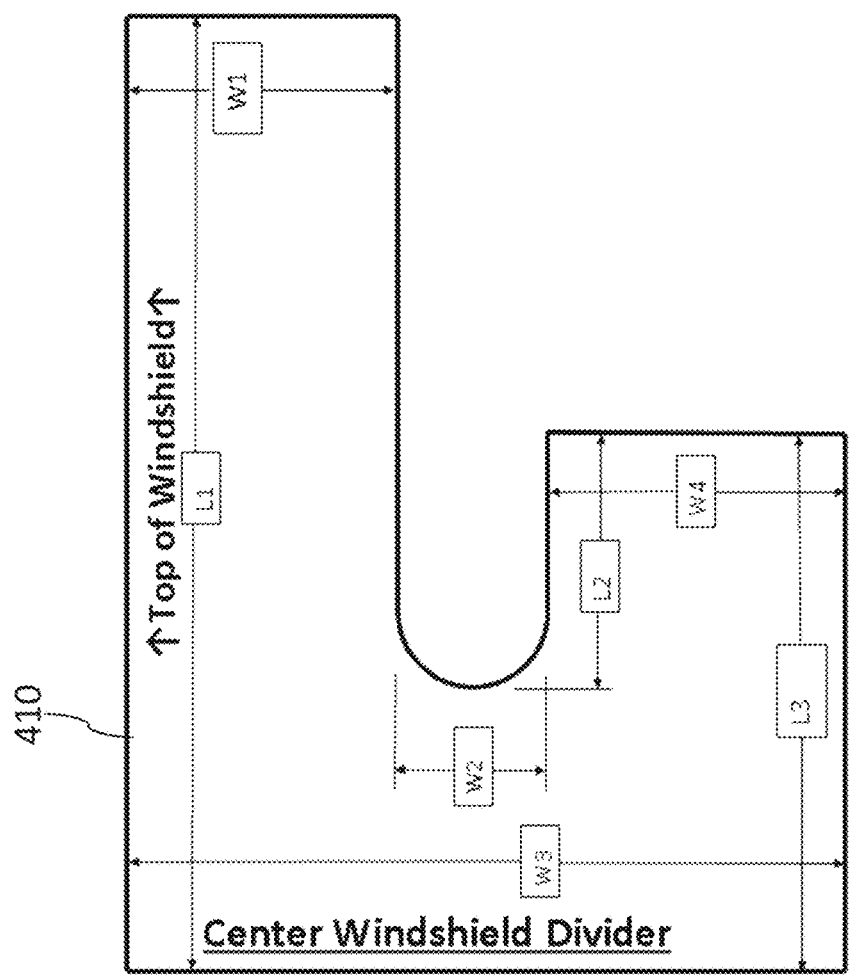
FIG. 4 shows the template of FIG. 2 with certain dimensions, in accordance with certain embodiments.

In certain embodiments, the exact dimensions of the template can vary from template to template and depending on the type of windshield the template is designed to be used with. For illustration purposes, various dimensions are shown on a template 410 in FIG. 4. A dimension L1 may be from about 6 inches to about 10 inches, a dimension L2 may be from about 1 inch to about 3 inches, a dimension L3 may be from about 3 inches to about 5.5 inches, a dimension W1 may be from about 1.5 inches to about 3.5 inches, a dimension W2 may be from about 0.75 inches to about 2 inches, a dimension W3 may be from about 4 inches to about 6 inches, and a dimension W4 may be from about 1.5 inches to about 4 inches. For example, for a Mack Pinnacle/Freightliner Cascadia truck, L1 may be about 8 inches, L2 may be about 2 inches, L3 may be about 4.25 inches, W1 may be about 2.25 inches, W2 inches may be about 1.25 inches, W3 may be about 6 inches and W4 may be about 2.5 inches. Where the template takes the form of an edge-to-edge template, the template generally comprises a length about the same as a length of the windshield. Alternatively, the template may comprise a width about the same as a width of the windshield. In other configurations, the template may comprise a length and a width about the same as a length and a width of the windshield.

Figure 5:
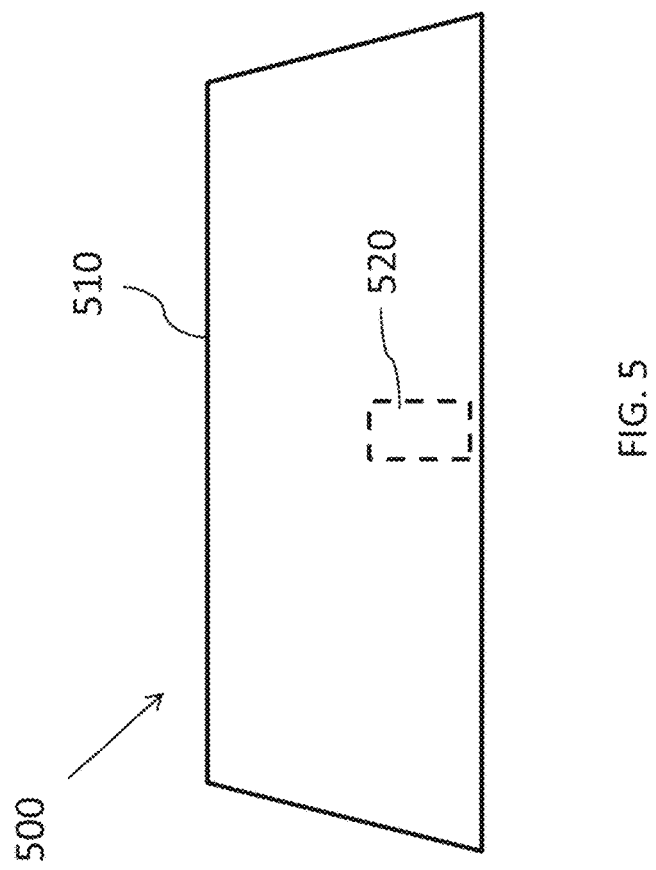
FIG. 5 shows a windshield comprising an integral alignment indicator, in accordance with certain examples.

In certain embodiments, the alignment indicators described herein can be integrated into a vehicle windshield so a separate template is not needed. One example of a vehicle windshield with an integral alignment indicator is shown in FIG. 5. The windshield 500 comprises a substrate 510 and an integral alignment indicator 520. The substrate 510 is typically glass, polycarbonate, plastic or other materials which are generally optically transparent (though they may be colored or tinted) to permit a vehicle operator to see through the substrate 510. The alignment indicator 520 may be visible under normal lighting conditions or may be visible by exposing the alignment indicator to a non-visible light source, e.g., an infrared light source, UV light source, etc. Where the windshield comprises an integral alignment indicator 520 which is viewable using visible light, the alignment indicator 520 is typically positioned outside of the viewing path of the vehicle operator so the alignment indicator 520 and any aligned/mounted safety devices do not obstruct the view of the vehicle operator. In some examples, the integral alignment indicator 520 may comprise a geometry and size that mirrors a geometry and size of a terminal region of the vehicle safety device to be mounted to the windshield. As noted herein, the vehicle safety device to be mounted to the windshield may be, for example, a vehicle safety device configured for lane keeping monitoring, collision avoidance monitoring, speed monitoring or video recording or may provide other functionalities. In some embodiments, the windshield 500 may be sized and arranged to couple to a windshield frame of a truck, a subway car, an airplane, a train car, an unmanned aerial vehicle, or a passenger automobile.

Figure 6:
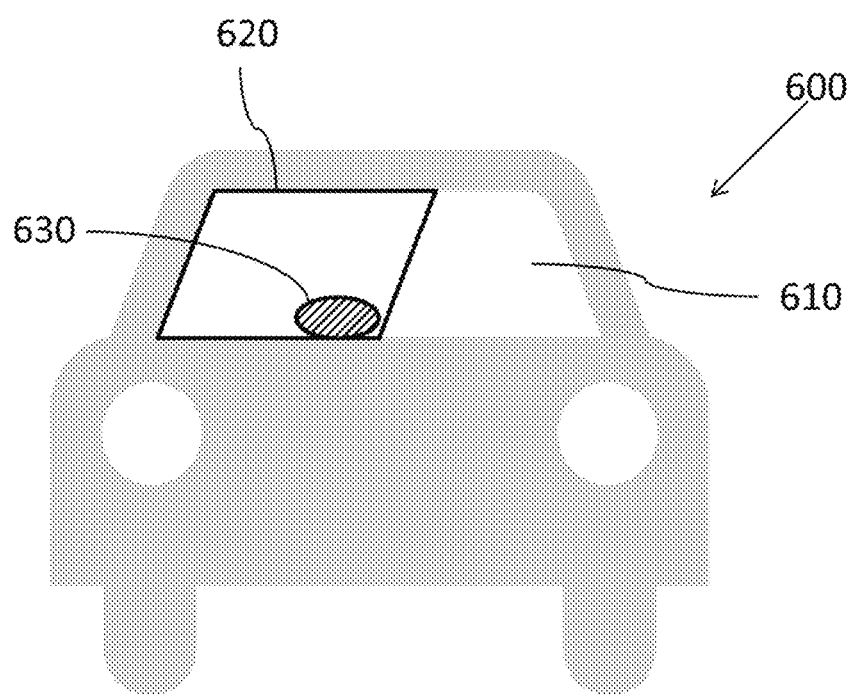
FIG. 6 shows a template applied to a passenger automobile windshield, in accordance with certain examples.

In certain examples, the templates described herein can be used with a passenger automobile to align a vehicle safety device to the windshield of the passenger automobile. Referring to FIG. 6, a passenger automobile 600 is shown that comprises a windshield 610. A template 620 is shown as being reversibly coupled to the windshield 610. The template 620 comprises an alignment indicator 630 which can be used to align a vehicle safety device prior to mounting the vehicle safety device to the windshield 610. The exact nature of the passenger car can vary and includes, but is not limited to, electric powered cars, gasoline powered cars, natural gas powered cars, diesel powered cars, propane powered cars, battery powered cars and other types of passenger automobiles. The particular vehicle safety device used in the passenger vehicle can vary and may include, for example, lane keeping monitoring, collision avoidance monitoring, speed monitoring, distance monitoring, video recording or other desired functions. While a single alignment indicator 630 is shown in FIG. 6, more than one alignment indicator can be present if desired. Further, the exact nature of the template 620 can vary, and the substrate of the template 620 can be opaque, optically transparent, semi-transparent, etc. In some examples, the substrate of the template 620 may comprise one or more of a polyolefin (e.g., polyethylene or polypropylene), cardboard, plywood, acrylic, ABS plastic, melamine, vinyl based materials or paper based materials. Further, the template 620 can be configured as a multi-layer composite if desired to provide for increased strength. The template 620 can be designed for single use, e.g., can be torn away or ripped away, or can be reused. The template 620 can be coupled to the inside of the windshield 610 or the outside of the windshield 610 or two or more templates can be used with one template coupled to the inside of the windshield 610, one template coupled to the outside of the windshield 610 or both templates coupled to the inside or the outside of the windshield 610. In alternative configurations, the windshield 610 may comprise an integral alignment indicator as described herein.

Figure 7:
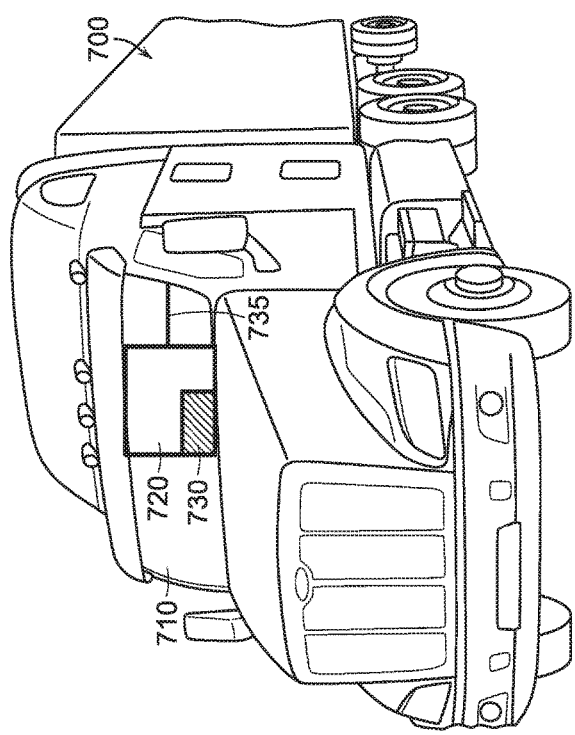
FIG. 7 shows a template applied to a truck windshield, in accordance with certain examples.

In certain embodiments, the templates described herein can be used with a truck, e.g., a class 3-class 6 truck, to align a vehicle safety device to the windshield of the truck. Referring to FIG. 7, a truck 700 is shown that comprises a windshield 710. A template 720 is shown as being reversibly coupled to the windshield 710. The template 720 comprises an alignment indicator 730 which can be used to align a vehicle safety device prior to mounting the vehicle safety device to the windshield 710. The template 720 comprises a tab 735 to assist in placing the template 730 in the proper position on the windshield 710. For example, the tab 735 may stretch to one side of the windshield 710 so that the template 720 runs from edge to edge of the windshield 710. The exact nature of the truck can vary and includes, but is not limited to, electric trucks, gasoline trucks, natural gas trucks, diesel trucks, propane trucks, battery powered trucks, dump trucks, tractor trailer tractors, and other types of trucks with two, three or more axles. The particular vehicle safety device used in the truck can vary and may include, for example, lane keeping monitoring, collision avoidance monitoring, speed monitoring, distance monitoring, video recording or other desired functions. While a single alignment indicator 730 is shown in FIG. 7, more than one alignment indicator can be present if desired. Further, the exact nature of the template 720 can vary, and the substrate of the template 720 can be opaque, optically transparent, semi-transparent, etc. In some examples, the substrate of the template 720 may comprise one or more of a polyolefin (e.g., polyethylene or polypropylene), cardboard, plywood, acrylic, ABS plastic, melamine, vinyl based materials or paper based materials. Further, the template 720 can be configured as a multi-layer composite if desired to provide for increased strength. The template 720 can be designed for single use, e.g., can be torn away or ripped away, or can be reused. The template 720 can be coupled to the inside of the windshield 710 or the outside of the windshield 710 or two or more templates can be used with one template coupled to the inside of the windshield 710, one template coupled to the outside of the windshield 710 or both templates coupled to the inside or the outside of the windshield 710. In alternative configurations, the windshield 710 may comprise an integral alignment indicator as described herein.

Figure 8:
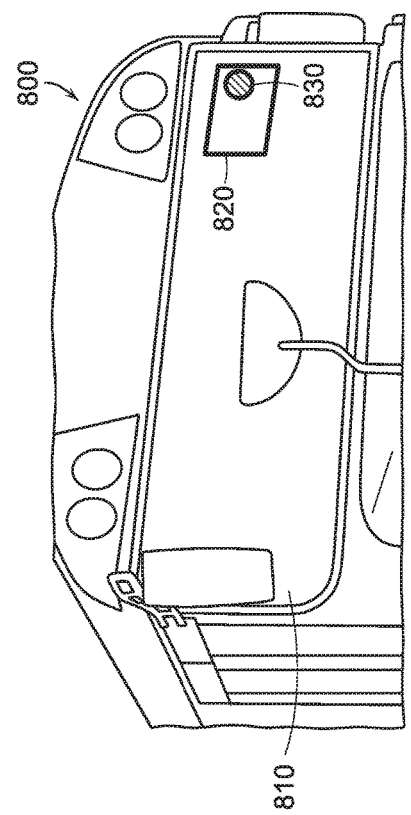
FIG. 8 shows a template applied to a bus windshield, in accordance with certain examples.

In certain configurations, the templates described herein can be used with a bus, e.g., a school bus, passenger bus, patient transport bus, etc. to align a vehicle safety device to the windshield of the bus. Referring to FIG. 8, a bus 800 is shown that comprises a windshield 810. A template 820 is shown as being reversibly coupled to the windshield 810. The template 820 comprises an alignment indicator 830 which can be used to align a vehicle safety device prior to mounting the vehicle safety device to the windshield 810. The template 820 is shown as a two edge template that contacts an upper side of the windshield and the left side of the windshield 810 (when the windshield 810 is viewed from the driver's seat of the bus 810). The exact nature of the bus can vary and includes, but is not limited to, electric buses, gasoline buses, natural gas buses, diesel buses, propane buses, battery powered buses, school buses, passenger buses, and other types of buses designed to carry ten or more people, for example. The particular vehicle safety device used in the bus can vary and may include, for example, lane keeping monitoring, collision avoidance monitoring, speed monitoring, distance monitoring, proximity monitoring, video recording or other desired functions. While a single alignment indicator 830 is shown in FIG. 8, more than one alignment indicator can be present if desired. Further, the exact nature of the template 820 can vary, and the substrate of the template 820 can be opaque, optically transparent, semi-transparent, etc. In some examples, the substrate of the template 820 may comprise one or more of a polyolefin (e.g., polyethylene or polypropylene), cardboard, plywood, acrylic, ABS plastic, melamine, vinyl based materials or paper based materials. Further, the template 820 can be configured as a multi-layer composite if desired to provide for increased strength. The template 820 can be designed for single use, e.g., can be torn away or ripped away, or can be reused. The template 820 can be coupled to the inside of the windshield 810 or the outside of the windshield 810 or two or more templates can be used with one template coupled to the inside of the windshield 810, one template coupled to the outside of the windshield 810 or both templates coupled to the inside or the outside of the windshield 810. In alternative configurations, the windshield 810 may comprise an integral alignment indicator as described herein.

Figure 9:
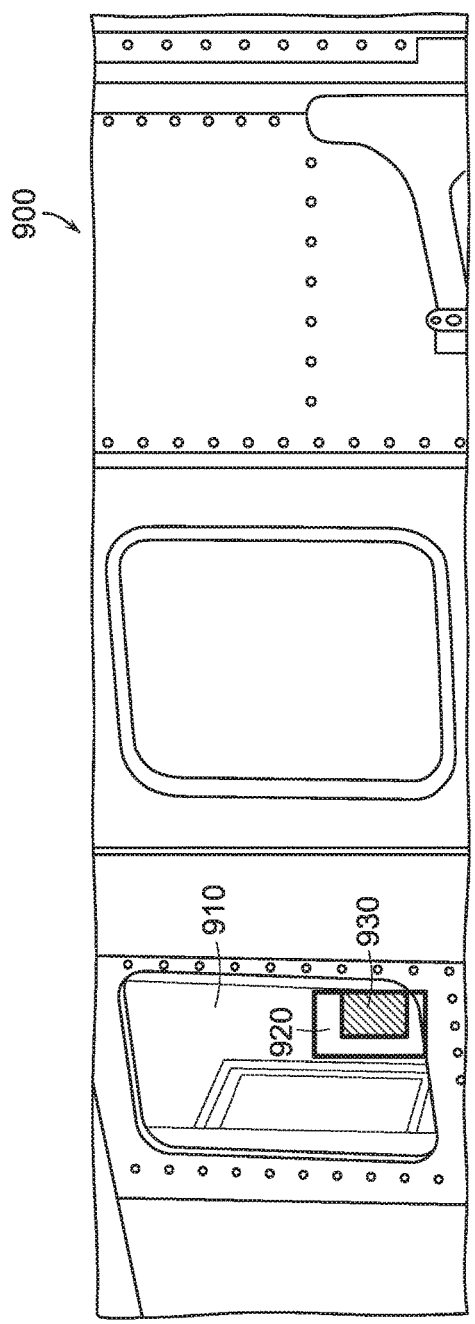
FIG. 9 shows a template applied to a subway car windshield, in accordance with certain examples.

In certain configurations, the templates described herein can be used with mass transit vehicles such as, for example, subway cars to align a vehicle safety device to the windshield of the mass transit vehicle. Referring to FIG. 9, a subway car 900 is shown that comprises a windshield 910, though the windshield 910 often takes the form of a window comprising a flat piece of glass or other material such as polycarbonate. A template 920 is shown as being reversibly coupled to the windshield 910. The template 920 comprises an alignment indicator 930 which can be used to align a vehicle safety device prior to coupling the vehicle safety device to the windshield 910. The exact nature of the mass transit vehicle can vary and includes, but is not limited to, electric subway cars, gasoline subway cars, natural gas subway cars, diesel subway cars, propane subway cars, battery powered subway cars, and other types of subway cars designed to carry five or more people, for example. The particular vehicle safety device used in the mass transit vehicle can vary and may include, for example, lane keeping monitoring, collision avoidance monitoring, speed monitoring, automated speed control measurements, distance monitoring, proximity monitoring, video recording or other desired functions. While a single alignment indicator 930 is shown in FIG. 9, more than one alignment indicator can be present if desired. Further, the exact nature of the template 920 can vary, and the substrate of the template 920 can be opaque, optically transparent, semi-transparent, etc. In some examples, the substrate of the template 920 may comprise one or more of a polyolefin (e.g., polyethylene or polypropylene), cardboard, plywood, acrylic, ABS plastic, melamine, vinyl based materials or paper based materials. Further, the template 920 can be configured as a multi-layer composite if desired to provide for increased strength. The template 920 can be designed for single use, e.g., can be torn away or ripped away, or can be reused. The template 920 can be coupled to the inside of the windshield 910 or the outside of the windshield 910 or two or more templates can be used with one template coupled to the inside of the windshield 910, one template coupled to the outside of the windshield 910 or both templates coupled to the inside or the outside of the windshield 910. In alternative configurations, the windshield 910 may comprise an integral alignment indicator as described herein.

Figure 10:
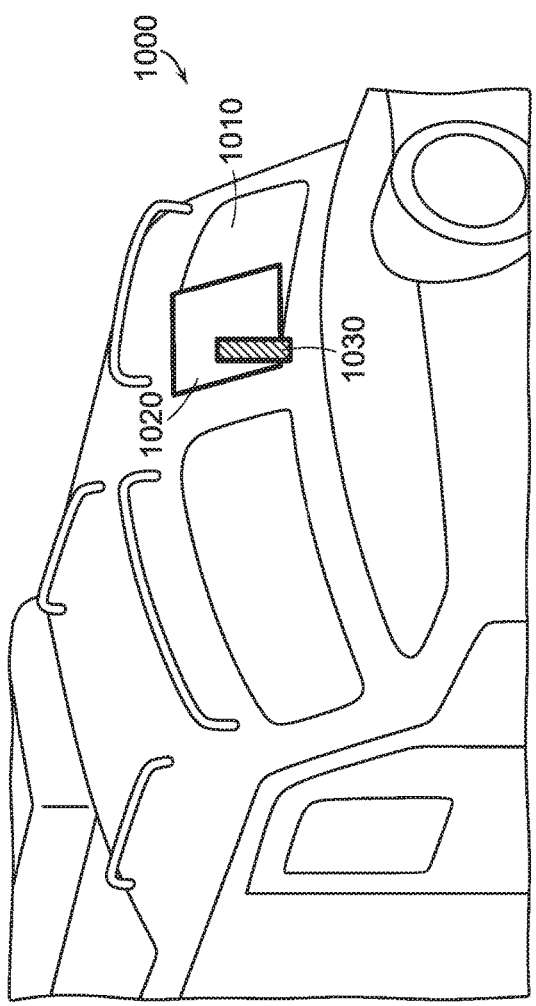
FIG. 10 shows a template applied to a train car windshield, in accordance with certain examples.

In certain examples, the templates described herein can be used with train cars, e.g., locomotives, to align a vehicle safety device to the windshield of the train car. Referring to FIG. 10, a locomotive 1000 is shown that comprises a windshield 1010. A template 1020 is shown as being reversibly coupled to the windshield 1010. In this configuration, the template 1020 is a three edge template as it contacts an upper surface of the windshield 1010, an inner divided surface of the windshield 1010 and a lower surface of the windshield 1010. The template 1020 comprises an alignment indicator 1030 which can be used to align a vehicle safety device prior to mounting the vehicle safety device to the windshield 1010. The exact nature of the train car can vary and includes, but is not limited to, electric train cars, gasoline train cars, natural gas train cars, diesel train cars, propane train cars, battery powered train cars, coal fired train cars and other types of train cars designed to carry five or more people, for example. The particular vehicle safety device used in the train cars can vary and may include, for example, track condition monitoring, collision avoidance monitoring, speed monitoring, automated speed control measurements, road crossing monitoring, distance monitoring, proximity monitoring, video recording or other desired functions. While a single alignment indicator 1030 is shown in FIG. 10, more than one alignment indicator can be present if desired. Further, the exact nature of the template 1020 can vary, and the substrate of the template 1020 can be opaque, optically transparent, semi-transparent, etc. In some examples, the substrate of the template 1020 may comprise one or more of a polyolefin (e.g., polyethylene or polypropylene), cardboard, plywood, acrylic, ABS plastic, melamine, vinyl based materials or paper based materials. Further, the template 1020 can be configured as a multi-layer composite if desired to provide for increased strength. The template 1020 can be designed for single use, e.g., can be torn away or ripped away, or can be reused. The template 1020 can be coupled to the inside of the windshield 1010 or the outside of the windshield 1010 or two or more templates can be used with one template coupled to the inside of the windshield 1010, one template coupled to the outside of the windshield 1010 or both templates coupled to the inside or the outside of the windshield 1010. In alternative configurations, the windshield 1010 may comprise an integral alignment indicator as described herein.

Figure 11:
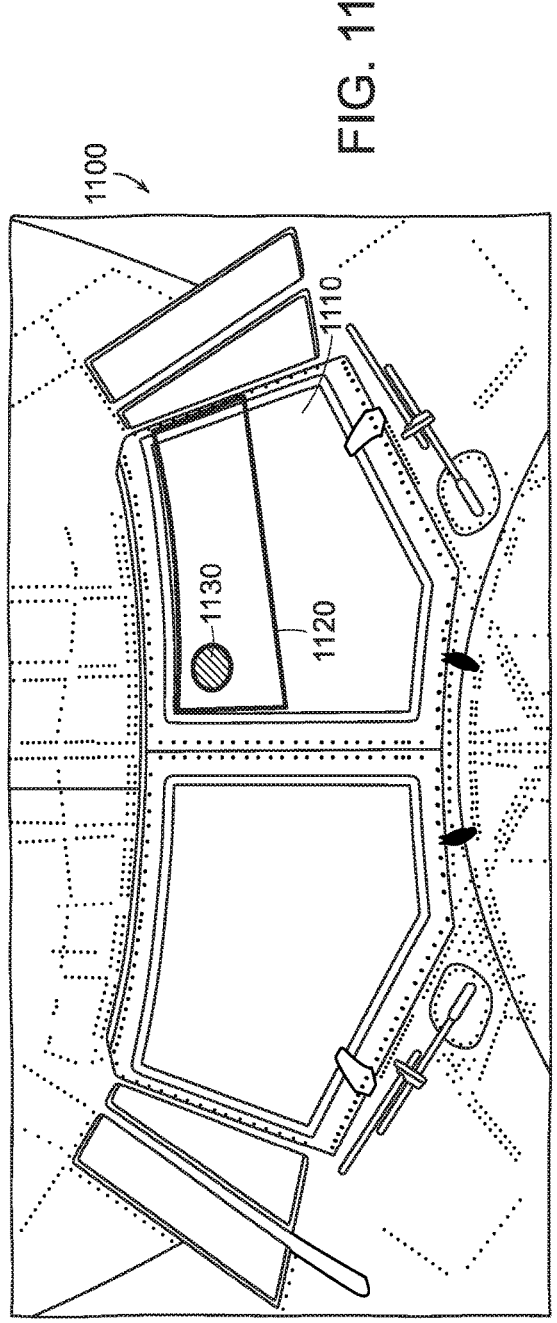
FIG. 11 shows a template applied to an airplane windshield, in accordance with certain examples.

In certain embodiments, the templates described herein can be used with airplanes or other aerospace vehicles to align a vehicle safety device to the windshield of the airplane. Referring to FIG. 11, an airplane 1100 is shown that comprises a windshield 1110. A template 1120 is shown as being reversibly coupled to the windshield 1110. In this configuration, the template 1120 is a three edge template as it contacts an upper surface of the windshield 1110, an inner divided surface of the windshield 1110 and an outer surface (left side when viewed from the cockpit) of the windshield 1110. The template 1120 comprises an alignment indicator 1130 which can be used to align a vehicle safety device prior to mounting the vehicle safety device to the windshield 1110. The exact nature of the airplane can vary and includes passenger planes, commercial planes, and military planes and may also include helicopters or other manned aerial vehicles which are not airplanes. The particular vehicle safety device used in the airplane can vary and may include, for example, object avoidance monitoring, collision avoidance monitoring, speed monitoring, automated flight control measurements, video recording or other desired functions. While a single alignment indicator 1130 is shown in FIG. 11, more than one alignment indicator can be present if desired. Further, the exact nature of the template 1120 can vary, and the substrate of the template 1120 can be opaque, optically transparent, semi-transparent, etc. In some examples, the substrate of the template 1120 may comprise one or more of a polyolefin (e.g., polyethylene or polypropylene), cardboard, plywood, acrylic, ABS plastic, melamine, vinyl based materials or paper based materials. Further, the template 1120 can be configured as a multi-layer composite if desired to provide for increased strength. The template 1120 can be designed for single use, e.g., can be torn away or ripped away, or can be reused. The template 1120 can be coupled to the inside of the windshield 1110 or the outside of the windshield 1110 or two or more templates can be used with one template coupled to the inside of the windshield 1110, one template coupled to the outside of the windshield 1110 or both templates coupled to the inside or the outside of the windshield 1110. In alternative configurations, the windshield 1110 may comprise an integral alignment indicator as described herein.

Figure 12:
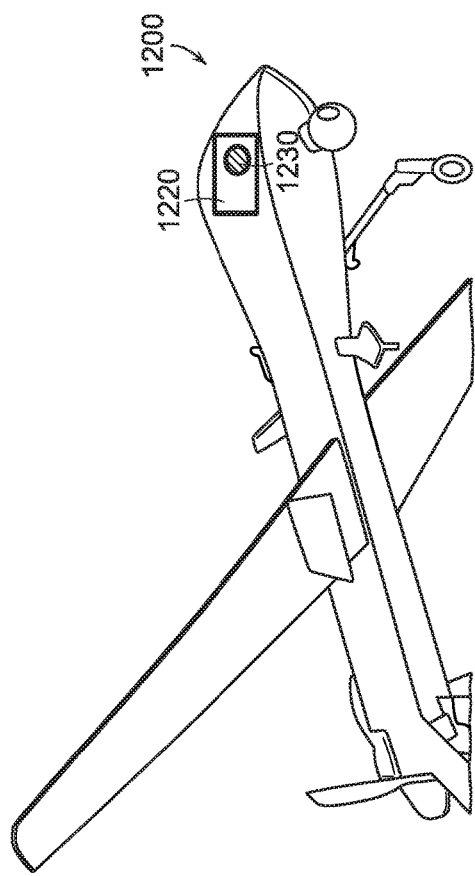
FIG. 12 shows a template applied to an unmanned aerial vehicle, in accordance with certain examples.

In certain embodiments, the templates described herein can be used with unmanned aerial vehicles or satellites. Referring to FIG. 12, an unmanned aerial vehicle 1200, e.g., a drone, is shown that comprises an opening (obscured by the template 1220). While the opening is not a true windshield since a driver or operator is not physically present in the vehicle 1200, the opening can be used to permit the vehicle safety device to be mounted and/or used. A template 1220 is shown as being reversibly coupled to the opening. In this configuration, the template 1220 is a four edge template (or edge-to-edge template) as it contacts each side of the opening. The template 1220 comprises an alignment indicator 1230 which can be used to align a vehicle safety device prior to coupling the vehicle safety device to the windshield 1210. The exact nature of the unmanned aerial vehicle can vary and includes drones, satellites, weather vehicles or other aerial vehicles. The particular vehicle safety device used in the aerial vehicle can vary and may include, for example, object avoidance monitoring, collision avoidance monitoring, speed monitoring, automated flight control measurements, temperature monitoring, pressure monitoring, video recording or other desired functions. While a single alignment indicator 1230 is shown in FIG. 12, more than one alignment indicator can be present if desired. Further, the exact nature of the template 1220 can vary, and the substrate of the template 1220 can be opaque, optically transparent, semi-transparent, etc. In some examples, the substrate of the template 1220 may comprise one or more of a polyolefin (e.g., polyethylene or polypropylene), cardboard, plywood, acrylic, ABS plastic, melamine, vinyl based materials or paper based materials. Further, the template 1220 can be configured as a multi-layer composite if desired to provide for increased strength. The template 1220 can be designed for single use, e.g., can be torn away or ripped away, or can be reused. The template 1220 can be coupled to the inside of the opening or the outside of the opening or two or more templates can be used with one template coupled to the inside of the opening, one template coupled to the outside of the opening or both templates coupled to the inside or the outside of the opening. In alternative configurations, the opening may comprise a substrate comprising an integral alignment indicator as described herein.

The templates described herein can be used in connection with other types of vehicles including, but not limited to, ships, submarines or other vehicles. Further, the template can be configured with different shapes, sizes and materials depending on the overall shape, size, etc. of the windshield or opening the template is reversibly coupled.

In certain embodiments, the templates described herein can be used with a mask to enhance viewing of the alignment indicators. For example, an opaque mask can be applied to one side of the windshield and used to obscure areas of the windshield other than the area or position where the alignment indicator of the template is positioned. The mask can be separate from the template or present within the template or windshield. In further configurations, the templates described herein may generally be clear, opaque or be clear with opaque portions or be opaque with clear portions. For example, the template may be clear but comprise opaque portions where the safety device is to be aligned. Alternatively, the template may be opaque but comprise transparent or clear markings where the safety device is to be aligned. In some configurations, the template may be colored in certain areas to facilitate easy viewing of the alignment marks present on the template. In other instances, the alignment marks may be viewable using infrared light or other non-visible light to permit the template to remain on the windshield post-installation of the vehicle safety device. For example, the template may be integral to window tint film which can be applied to the inner surface of a windshield. The window tint film may comprise integral alignment markings which can be viewed using normal visible light, infrared light or other means. The presence of markings which are viewable using non-visible light permits installation of the vehicle safety device without the template markings interfering with normal viewing through the windshield.

In use of the template described herein, the template is disposed on the windshield of the vehicle. The vehicle safety device is then aligned with the alignment indicator on the template prior to mounting the vehicle safety device to (or near) the windshield of the vehicle. Once the vehicle safety device is mounted, the template can be removed or it may remain in place post-install. In some examples, the template may comprise written information on it to provide guidance to the vehicle operator regarding use of the vehicle safety devices. The template can be removed by the vehicle operator prior to operation of the vehicle. As noted herein, the template can be disposed on the inside or the outside of the windshield. The template may comprise one, two, three or more alignment indicators. The template can be configured with a raised surface configured to receive a terminal end of the vehicle safety device.

In some instances, the templates can be packaged into a kit with instructions for use of the template. The kit may comprise the template and the instructions and may also include, if desired, a windshield. In some examples, the kit comprises a windshield with the template pre-disposed on the windshield to facilitate easy installation of the windshield and vehicle safety devices. In some examples, the template is sized and arranged to be smaller than a width and a length of the vehicle windshield. In other examples, the template comprises about a same length and about a same width as a length and a width of the vehicle windshield. In certain instances, the substrate comprises one or more of a polyolefin, cardboard, plywood, acrylic, ABS plastic, melamine, vinyl or paper. In some examples, the kit comprises a vehicle windshield comprising an integral alignment indicator. For example, the integral alignment indicator can be viewable using non-visible light or visible light. In other examples, the alignment indicator or integral alignment indicator is sized and arranged to permit alignment of at least one of a vehicle safety device configured for lane keeping monitoring, collision avoidance monitoring, speed monitoring or video recording. In some embodiments, the vehicle windshield is sized and arranged to couple to a windshield frame of a truck, a passenger automobile, a subway car, an airplane, a train car, an unmanned aerial vehicle or other vehicles. In other embodiments, the kit also comprises a second template comprising a substrate sized and arranged to reversibly couple to the vehicle windshield, the template comprising at least one additional alignment indicator.

In certain embodiments, a virtual template can be projected onto a surface of the windshield and used to align the vehicle safety device. For example and referring to FIG. 13, a projected alignment indicator 1320 is shown as being projected onto a windshield 1310 from a projection device 1330. The projection device 1330 may be a projector, phone, mobile device, tablet, computer, etc. and can be coupled to some portion of the vehicle, e.g., the rear view mirror, headrest, etc. to provide for proper projection of the indicator 1320 on the windshield 1310. A vehicle safety device can be mounted to the windshield at the position of the indicator 1330, and then the projected indicator 1320 can be switched off.

While the templates described herein are described as being used in connection with windshields or openings, the templates could instead be used with bumpers, rear windshields, side mirrors, side windows or other structures present in the vehicle. Further, more than one template can be used with different areas of the vehicle to align and/or mount a safety device in a desired position.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A vehicle safety device mounting template comprising a substrate sized and arranged to reversibly couple to a windshield of a vehicle, in which the template is sized and arranged to be smaller than a width and a length of the windshield of the vehicle, the template comprising at least one alignment indicator present in a first position, wherein the first position corresponds to a position where a vehicle safety device is to be mounted to the windshield and within the vehicle.

2. The template of claim 1, in which the template is sized and arranged to contact two edges of the windshield of the vehicle.

3. The template of claim 1, in which the template is sized and arranged to contact three edges of the windshield of the vehicle.

4. The template of claim 1, in which the substrate comprises a polyolefin.

5. The template of claim 1, in which the polyolefin is polyethylene or polypropylene.

6. The template of claim 1, in which the substrate comprises cardboard, plywood, acrylic, ABS plastic, melamine, vinyl or paper.

7. The template of claim 1, in which the alignment indicator is circular or comprises a cut-out shape.

8. The template of claim 1, in which the alignment indicator comprises a raised surface.

9. The template of claim 1, in which the template is configured to tear away from the windshield.

10. The template of claim 1, in which the substrate is opaque and the alignment indicator is optically transparent.

11. A method of mounting a vehicle safety device to a windshield of a vehicle, the method comprising:
  disposing a template on the windshield of the vehicle, the template comprising a substrate configured to reversibly couple to the windshield of the vehicle, in which the template comprises at least one alignment indicator present on the template in a first position, wherein the first position corresponds to a position where a vehicle safety device is to be mounted to the windshield of the vehicle; and
  aligning the vehicle safety device with the alignment indicator on the template prior to mounting the vehicle safety device to the windshield of the vehicle.

12. The method of claim 11, further comprising removing the template after the vehicle safety device is mounted.

13. The method of claim 11, further comprising configuring the template as a window film which remains on the windshield after the vehicle safety device is mounted.

14. The method of claim 11, in which the disposing step comprises disposing the template on an interior surface of the windshield.

15. The method of claim 11, in which the disposing step comprises disposing the template on an exterior surface of the windshield.

16. The method of claim 11, further comprising configuring the template with a second alignment indicator.

17. The method of claim 11, further comprising configuring the alignment indicator with a raised surface configured to receive a terminal end of the vehicle safety device.

18. The method of claim 11, further comprising configuring the substrate of the template to be opaque and configuring the alignment indicator to be optically transparent.

19. The method of claim 11, further comprising configuring the alignment indicator to be opaque and configuring the substrate of the template to be optically transparent.

20. The method of claim 11, further comprising selecting the vehicle to be one of a passenger automobile, a truck, a train, a bus, a subway car, an airplane or an unmanned aerial vehicle.

* * * * *